June 22, 1954

E. F. LEWELLEN ET AL 2,682,025

VARIABLE SPEED TRANSMISSION CONTROL
WITH AN ADJUSTABLE LIMIT SWITCH

Filed Jan. 18, 1950

INVENTORS
EMMONS F. LEWELLEN
DARCY E. LEWELLEN

BY Toulmin & Toulmin
ATTORNEYS

INVENTORS
EMMONS F. LEWELLEN
DARCY E. LEWELLEN
By Toulmin & Toulmin
ATTORNEYS

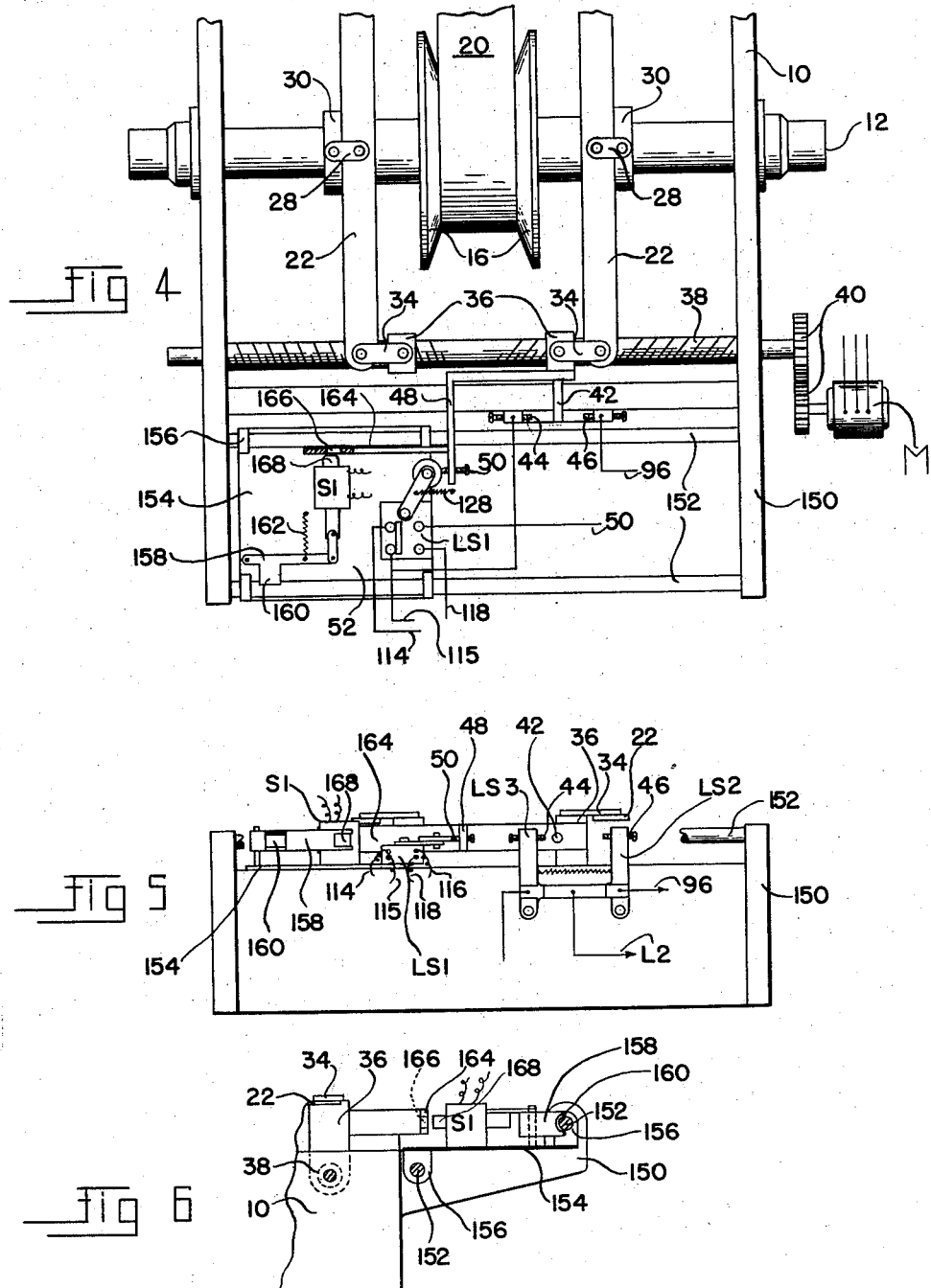

Patented June 22, 1954

2,682,025

UNITED STATES PATENT OFFICE 2,682,025

VARIABLE SPEED TRANSMISSION CONTROL WITH AN ADJUSTABLE LIMIT SWITCH

Emmons F. Lewellen and Darcy E. Lewellen, Columbus, Ind.

Application January 18, 1950, Serial No. 139,252

14 Claims. (Cl. 318—11)

This invention relates to variable speed transmissions, and to control devices and systems therefor.

In many machines and process apparatus, there are employed variable speed transmissions which are utilized for the purpose of obtaining control over the speed of the machines being driven. Among the many processes adapted for being carried out in machines which are benefited by being controllable in speed, are processes for treating strip metal, paper, cloth, thread, yarn, and many other materials.

In the treating of textile materials such as referred to above in long lengths, a great many work processes involve the application of liquids to the material as, for example, in the form of dye, and the subsequent drying of the material. In work cycles of this nature, the amount of moisture remaining in the material after it leaves the dryer, is best controlled by controlling the speed of movement of the material being treated.

At the same time, most materials, such as textile materials referred to, must be fed onto a spool or take-up reel, and the said spool or reel periodically replaced with another. In removing a filled spool, the entire process machinery is generally slowed down to its slowest speed and then stopped. Thereafter, the filled spool is removed and replaced by an empty spool and the machine is then again started at its slowest speed. When the material is well started on the spool, the machine is returned to its previous running speed.

It is desirable to be able to effect the foregoing changes in speed of the machine while still being able to return the machine automatically to some pre-selected optimum speed.

It is also of advantage to be able to adjust the optimum speed at which the machine runs, in order to compensate for differences in moisture content and the like in the material being treated.

Accordingly, one of the primary objects of this invention is the provision of a variable speed transmission having associated therewith, a control system such that the speed of operation of the transmission can readily be adjusted, but in which a predetermined maximum speed of operation can always be had after the transmission has been slowed down.

Another object of this invention is the provision of a control system for a variable speed transmission in which the maximum operating speed of the transmission can readily be adjusted at any time while the speed of operation of the transmission can be adjusted at any time independently of the adjustment of the maximum.

It is still another object to provide a control system for a variable speed transmission, in which the transmission will normally operate at a predetermined speed, but which permits slowing down of the transmission to a halt and thereafter the automatic return of the transmission to the speed of operation which it had before the said slowing down.

A still further object is the provision of a control system for the variable speed transmission having upper and lower stops to predetermine the possible variation in speed of the transmission, in which the stop determining the upper limit of speed can readily be adjusted to increase or decrease the maximum speed of operation of the transmission.

These and other objects and advantages will become more apparent upon reference to the following description taken in connection with the accompanying drawings, in which:

Figures 4, 5, and 6 are partial plan, end, and partial side views, respectively, of a modified form which a control device according to our invention may take.

Figure 1:
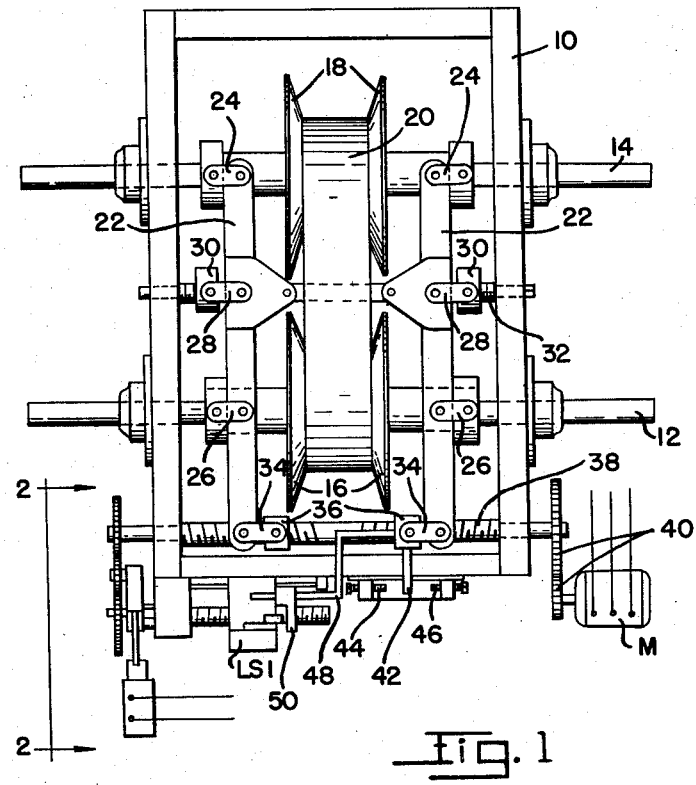
Figure 1 is a plan view of a transmission constructed according to our invention.

Referring to the drawings, the transmission shown therein comprises a frame 10 having journaled therein, a constant speed input shaft 12, and a variable speed output shaft 14. Mounted on shaft 12 are the adjustable sheave parts 16, and mounted on shaft 14, are the corresponding adjustable sheave parts 18. A suitable transmission belt 20 drivingly interconnects the sheaves according to practices well known in the art.

The sheave parts 16 and 18 are adjustable axially of their supporting shafts by means of the levers 22 pivoted to sheave parts 18 by links 24, and to sheave parts 16 by links 26. Intermediate links 24 and 26, each of the levers 22 is pivotally connected by a link 28 with a block 30 threaded onto a rod 32. The end parts of rod 32 are oppositely threaded so that adjustment of the rod will move the blocks 30 in opposite directions and thereby adjust the positions of levers 22 and sheave parts 16 and 18, so as to maintain belt 20 in good driving engagement with both of the said sheaves.

The lower ends of levers 22, as viewed in Figure 1, are connected by links 34 with the blocks 36 mounted on the oppositely threaded parts of screw 38 that is journaled in frame 10. It will be evident that adjustment of screw 38 will cause one set of sheave parts to move toward each other, and the other set to move away from each other, thereby to vary the driving ratio between shafts 12 and 14. Screw 38 is adjustable by being geared to a motor M, as by spur-gears 40. Motor M is reversible, and is preferably a three-phase motor, so it can readily be reversed by changing the direction of phase rotation of the electrical energy supplied thereto.

Carried on one of blocks 36 is a pin 42 movable between a pair of adjustable screws 44 and 46 which are associated with the actuating arms of limit switches which determine the maximum limits between which the driving ratio of the transmission can be adjusted.

The same block 36 also carries a part 48 that adjustably supports a cam 50 adapted for engagement with a limit switch LS1 which is connected in a circuit for determining a maximum speed for the output shaft 14 of the transmission, less than that determined by the switch associated with adjustment screw 44.

Figure 2:
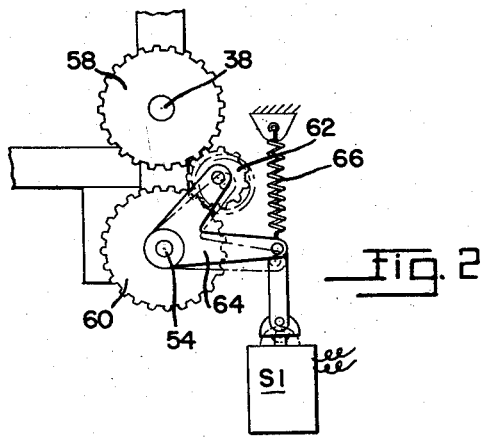
Figure 2 is a side elevational view showing a portion of the control devices for the transmission of Figure 1, and is indicated by the line 2—2 on Figure 1.

Turning to Figure 2, it will be observed that limit switch LS1 is mounted on a member 52 which is screw-threadedly engaged by a threaded rod 54 mounted in frame 10 and having the same thread thereon as that portion of screw 38 on which the block 36 is mounted that carries cam 50. Member 52 is preferably slidably supported on a rod 56 which also prevents rotation of the said member with the threaded rod 54.

Threaded rod 54 is adapted for being drivingly connected with screw 38 by means of the gear arrangement shown in Figure 2. In this view, it will be seen that screw 38 has a gear 58 on the end thereof, and that threaded rod 54 has a gear 60 thereon the same size as gear 58. An idler gear 62 connects gears 58 and 60, and is mounted on one end of a bell-crank lever 64 pivoted about the axis of rod 54 and spring urged by a spring 66 in a direction to cause the gearing to engage as shown in Figure 2. A solenoid S1 is connected with lever 64 so that when the solenoid is energized, it opposes spring 66 and moves the bell-crank lever and gear 36 into position to disengage the said gear from gear 58.

Turning again to Figure 3, the transmission is shown connected with its electrical control system. At the top of the view, the various parts illustrated are identified by legends, and the work-cycle illustrated, is that of drying a continuous length of material such as a textile fabric.

Figure 3:
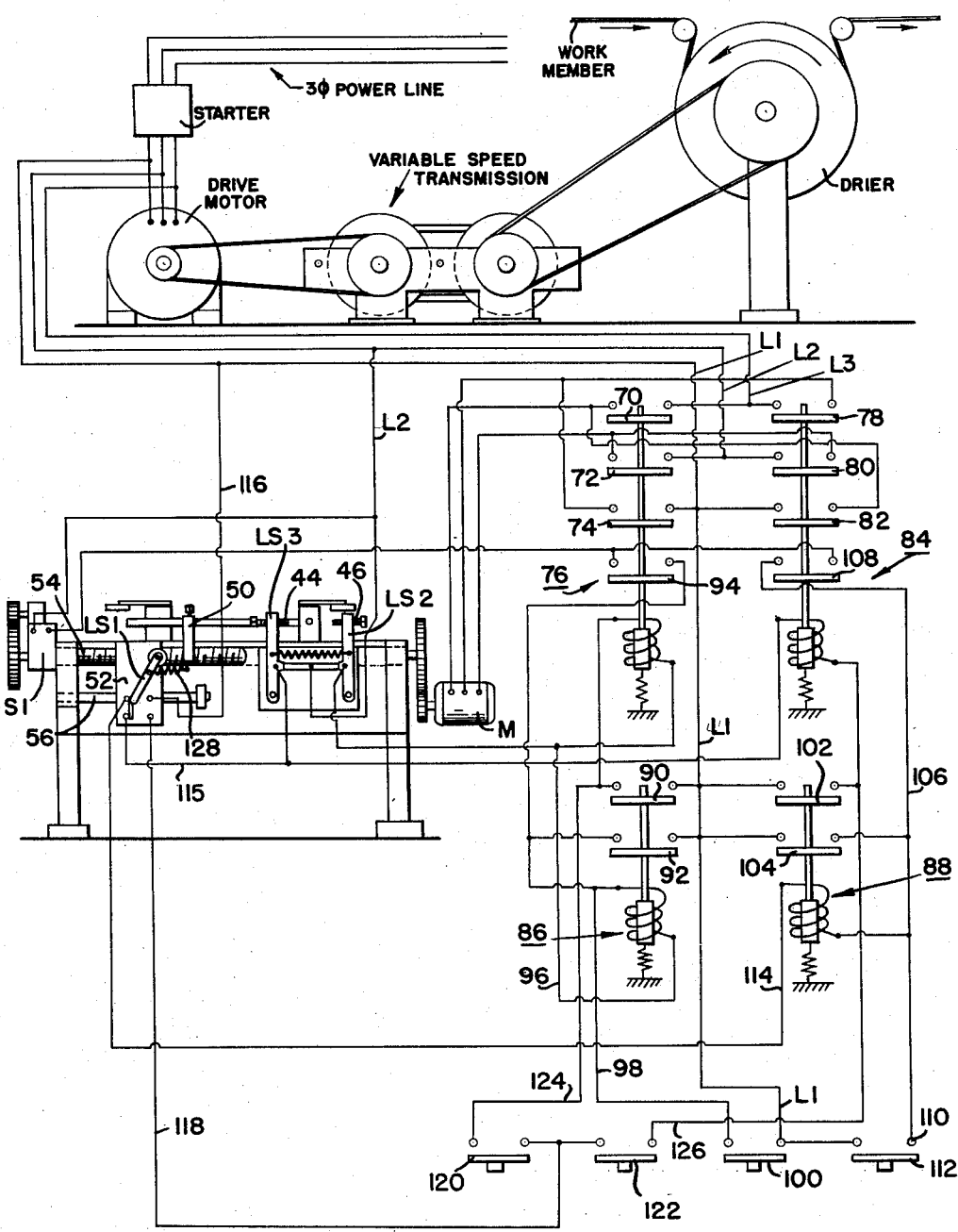
Figure 3 is a view showing the lower end of the transmission of Figure 1, and connected therewith, the electrical control circuit forming a part of this invention.

In Figure 3, the individual lines of the three-phase power line, are identified as at L1, L2 and L3. These lines are connected through the blades 70, 72 and 74 of a contactor generally indicated at 76 with the terminals of motor M for driving it in one direction. The same power lines are similarly connected, but in reverse order, with the terminals of motor M through blades 78, 80 and 82, and a second contactor generally indicated at 84.

Associated with contactor 76 is an auxiliary contactor 86, and similarly associated with contactor 84, is an auxiliary contactor 88. Contactor 86 has a blade 90 connected between power line L1 and one terminal of the actuating coil for contactor 76, the other terminal of which is connected with one terminal of switch LS2 associated with abutment screw 46. The other terminal of limit switch LS2 is connected with power line L2. It will be apparent that closing of contactor 86 will bring about energization of contactor 76, and that this energization will continue until contactor 86 is opened, or until switch LS2 is opened.

Contactor 86 also has a blade 92 that is connected between power line L1 and one of the contacts controlled by a blade 94 of contactor 76. The other contact controlled by blade 94, is connected with one terminal of solenoid S1, the other terminal of which is connected with power line L2. It will be apparent at this point, that whenever both of contactors 76 and 86 are closed, solenoid S1 will be energized for disengaging gear 62 from gear 58, thereby interrupting the driving connection between screw 38 and threaded rod 54.

One terminal of the coil for contactor 86 is connected by a wire 96 with the movable arm of limit switch LS2, while the other terminal of the said coil is connected by a wire 98 with one contact of the push-button switch 100 which has a second contact connected with power line L1.

Turning now to contactors 84 and 88, one terminal of the coil for contactor 84 is connected with the movable arm of limit switch LS3 associated with the button screw 44, while the other terminal of the coil is connected with one contact of blade 102 of contactor 88, the other contactor of which is connected with power line 1. Contactor 88 also has a blade 104 which has one contact connected with power line L1, and a second contact connected by wire 106 with one contact of blade 108 of contactor 84, the other contactor of which is connected with the side of solenoid S1 opposite its connection with power line L2.

One terminal of the coil for contactor 88 is connected with contact 110 of a push-button switch 112 which has a second contact connected with power line L1. The other terminal of the said coil is connected by a wire 114 with one of a pair of contacts controlled by limit switch LS1. The other of this pair of contacts is connected by a wire 115 with the movable arm of limit switch LS3.

Limit switch LS1 has a second pair of contacts, one of which is connected by wire 116 with power line L1, and the other of which is connected by wire 118 with one contact of each of a pair of push-button switches 120 and 122. The other contact of push-button 120 is connected by wire 124 with one side of the coil of contactor 76, the other side being connected, as pointed out previously, to the movable arm of switch LS2.

The other contact of switch 122 is connected by a wire 126 with one side of the coil of contactor 84, the other side of which is connected with the movable arm part of switch LS3 as described above.

Limit switch LS1 is normally biased by a spring 128 so as to close on the first-mentioned pair of contacts and which are connected respectively, one with the movable arm of switch LS3, and the other with one end of the coil of contactor 88. When limit switch LS1 is engaged by cam 50, it snaps from the position in which it is shown in Figure 3 into position to close on the other pair of contacts, and which are connected between switches 120 and 122 and power line L1.

It will be apparent from the foregoing, that switches 120 and 122 can be effective only when limit switch LS1 is in the position in which it is actuated by cam 50, and that when cam 50 is spaced from the limit switch, the said switches 120 and 122 are ineffective.

It will also be apparent that whenever one of contactors 86 and 88 are closed, the associated one of the contactors 76 and 84 is closed, and solenoid S1 is energized, thereby leading to an adjustment of the driving ratio of the transmission, but without any adjustment of threaded rod 54.

However, whenever cam 50 is in position to actuate limit switch LS1, then switches 120 and 122 can be availed of for energizing contactors 76 and 84, thereby bringing about energization of motor M to adjust the driving ratio of the transmission, but without energizing solenoid S1 so that threaded rod 54 rotates with screw 38 and causes limit switch LS1 to move in unison with cam 50.

A cycle of operations can now be described. Assuming that the transmission is operating at a certain speed, let it be further assumed that it is desired to halt the transmission so that a new take-up spool can be mounted for receiving the material to be treated. For slowing down the transmission, the operator closes switch 100, thereby establishing an energizing circuit from power line L1 through switch 100, wire 96, to the coil of contactor 86, then from the coil through wire 96, to limit switch LS2 and then to power line L2. This will energize contactor 86 and close blades 90 and 92 thereof. Blade 90 will establish a circuit from power line L1 to one end of the coil for contactor 76, and from the other end of the said coil through limit switch LS2 to power line L2. This will bring about closing of contactor 76, thereby connecting motor M with power lines L1, L2 and L3 for driving motor M in a direction to reduce the speed of output shaft 14.

When contactors 86 and 76 closed, a circuit was also established to power line L1 through blades 92 and 94 and solenoid S1 to power line L2, so that the afore-mentioned energization of motor M will drive screw 38, but will not drive threaded rod 54.

Blade 92 also serves to establish a holding circuit for the coil of contactor 86, so that the contactors will remain energized until arm 42 engages abutment screw 46 and opens limit switch LS2. When limit switch LS2 opens, the output shaft is operating at low speed, and the machine can readily be shut down when the spool therein is filled.

After the filled spool has been removed and an empty spool is placed in the machine, the drive motor for the transmission is again energized, so that the machine commences running again at its lowest speed. At this time, the material can readily be started onto the empty spool. Thereafter, the machine is speeded up by readjusting the transmission to its former operating speed by closing switch 112. Closing of switch 112 establishes a circuit to power line L1 through said switch, then through the coil for contactor 88, switch 114, the left-hand pair of contacts of limit switch LS1, and limit switch LS3 to power line L2. This will close contactor 88, and blade 102 thereof, will establish an energizing circuit from power line L1 through the coil of contactor 84 and limit switch LS3 to power line L2, and this will close contactor 84 and connect motor M with power lines L1, L2 and L3 in such a manner that its direction of rotation is opposite to that which obtains by closing of contactor 76.

The screw 38 is therefore driven in a direction to increase the speed of output shaft 14. Closing of contactors 88 and 84 also establishes a circuit through blades 104 and 108 to solenoid S1, so that gear 62 is disengaged from gear 58 in the same manner previously described, and whereby rotation of screw 38 is not accompanied by any adjustment of threaded rod 54. Blade 104 and contactor 88 also establishes a holding circuit therefor, so that contactors 88 and 84 will remain energized until limit switch LS1 is engaged and actuated by block 50. At this point, contactors 88 and 84 will be deenergized and adjustment of the driving ratio will halt so that it is again operating at the same speed as it was before it was initially slowed down, as described above.

Whenever limit switch LS1 is actuated by cam 50, a circuit is established from power line L1 through wire 116, the right-hand pair of contacts of limit switch LS1 and wire 118, to switches 120 and 122. Under these conditions, switches 120 and 122 can be availed of for adjusting the speed of the transmission, while simultaneously adjusting the position of limit switch LS1. For example, if it is desired to slow down the transmission, then switch 120 is closed and establishes a circuit through wire 124 to the coil of contactor 76. This will close contactor 76, while leaving contactor 86 open. Thus, motor M will be energized to turn the screw 38 in a direction to reduce the speed of output shaft 14, but inasmuch as solenoid S1 is not energized, threaded rod 54 will be driven through gears 58, 60 and 62 and cause switch LS1 to move in unison with its actuating cam 50. This adjustment of the transmission can continue until limit switch LS2 is opened.

If, on the other hand, it is desired to increase the speed of the transmission, then switch 122 is closed and establishes an energizing circuit for the coil of contactor 84. This will close contactor 84 and energize motor M to run in a direction to increase the speed of output shaft 14, but inasmuch as solenoid S1 is not energized, rod 54 will rotate in unison with screw 38 and cause limit switch LS1 to move in unison with cam 50. This adjusting movement of the transmission can continue until the limit switch LS3 is opened.

It will now be apparent that the transmission, when running at any predetermined speed, can be slowed down to its slowest speed and halted, and thereafter automatically returned to the said predetermined speed. Also, whenever the transmission is running at said predetermined speed, a selective adjustment of that speed can be made. Thus, the transmission is normally adjustable between an upper limit determined by switch LS1, and a lower limit determined by switch LS2, while switches LS2 and LS3 determine the maximum limits of adjustment of the transmission.

Turning now to Figures 4, 5, and 6, there will be seen a modified arrangement of our control device. The portions of Figures 4, 5, and 6 which correspond with portions of Figures 1 through 3 bear corresponding numbers, and the description of these corresponding parts of the device obtains for all of the views.

In Figures 4, 5, and 6, the frame 10 of the transmission has an extension 150 thereon, and extending transversely of the extension parallel to screw 38 are a pair of rods 152 which slidably support a plate or platform 154, as by means of the bearings 156. Plate 154 serves as a support for limit switch LS1 and solenoid S1, this switch and solenoid corresponding in function to switch LS1 and solenoid S1 described in connection with Figures 1 through 3.

Also mounted on platform 154 is a brake arm 158 having a brake shoe portion 160 adapted for engagement with one of rods 152. Spring 162 normally urges brake arm 158 toward brake disengaged position, and energization of solenoid S1 is adapted for urging the said brake arm into brake engaging position.

In the first modification of our control device, the support for limit switch LS1 was moved in unison with one of the nuts 36 by a threaded rod selectively engageable with screw 38. According to the form of the invention illustrated in Figures 4, 5, and 6, plate 154 is movable in unison with the right-hand one of nuts 36 by means of extension 164 on arm 48.

This extension has an aperture 166 adapted for engageemnt with a part 168 on the armature of solenoid S1 when the said solenoid is de-energized. It will be apparent at this point that when solenoid S1 is de-energized, plate 154 is connected with right-hand nut 36 for movement in unison therewith, and that when the plate and nut are so connected, brake arm 158 is in disengaged position.

However, upon energization of solenoid S1 the connection between plate 154 and right-hand nut 36 is interrupted, and the brake arm is moved to brake engaged position, thereby firmly holding plate 154 in its adjusted position. It will be apparent that the function of solenoid S1 in the modified form of this invention is the same as it has in the modification shown in Figures 1 through 3, wherein energization of the solenoid disconnected gears 58 and 60 for independent movement of right-hand nut 36 and the support for LS1, while de-energization of the said solenoid interconnected the said nut and support for movement in unison.

In connection with the modified form of the invention, it will also be evident that, as in the case of the first modification, abutment member 50 must be in engagement with the movable arm of limit switch LS1 before energization of solenoid S1 can take place. Abutment 50 and aperture 166 in extension 164 are therefore adjusted relatively, so that when the said abutment is in position to actuate limit switch LS1, the said aperture will be aligned with part 168 of the armature of solenoid S1.

It will be understood that this invention is susceptible to modification in order to adapt it to different usages and conditions, and, accordingly, it is desired to comprehend such modifications within this invention as may fall within the scope of the appended claims.

We claim:

1. In a control system for a variable speed transmission; a member movable for varying the driving ratio of the transmission, a reversible motor energizable for actuating said member in its opposite directions of movement, a control element positioned for engagement by said member in one direction of movement of the member and adapted for de-energizing said motor when so engaged to predetermine at least one limit of adjustment of said member, means movably supporting said control element for movement in the same direction as said member, means for energizing said motor, and clutch means selectively operable for drivingly connecting said control element with said member so as to move in unison with said member to adjust the limit of adjustment of the member which is determined by said element, or for disconnecting said control element from said member to leave said limit of adjustment in a fixed position.

2. In a control system for a variable speed transmission; a member movable for varying the driving ratio of the transmission, a reversible motor energizable for actuating said member in its opposite directions of movement, an electrical control element positioned for engagement by said member and adapted for de-energizing said motor when so engaged to predetermine at least one limit of adjustment of said member, means supporting said control element for movement in the same direction as said member, first control means operable for reversibly energizing said motor while said control element remaining stationary, and second control means operable for reversibly energizing said motor and including clutch means for drivingly connecting said control element with said member for causing movement of said control element in unison with said member, said second control means being connected in circuit with said control element so as to be operatvie only while said control element is engaged by said member.

3. In a control system for an adjustable member; first and second control elements adapted for actuation in response to said member reaching respective opposite limits of its travel operable to halt the member when so actuated, a third control element adapted for actuation in response to said member reaching an intermediate point in its travel and also operable to halt the member when so actuated, first control means operable to cause movement of said member between the limits of said first and third control elements while holding said third control element stationary, and second control means operable to cause movement of said member between the limits of said first and second control elements, said second control means including clutch means operable for causing said third control element to move in unison with said member, there being means supporting said third control element for movement in the same direction as said adjustable member.

4. In a control system for a variable speed transmission having drivingly connected input and output shafts and a member movable for varying the driving ratio between said shafts; a threaded rod engaging said member and a reversible motor energizable for driving said rod in its opposite directions, a limit switch adapted for actuation in response to a predetermined amount of movement of said member in the direction to increase the speed of said output shaft, a second threaded rod supporting said limit switch, said limit switch being in circuit with said motor for de-energizing the same when the said switch is actuated, and control means operable for energizing said motor while maintaining said rods disconnected, and for energizing said motor while drivingly connecting said rods.

5. In a control system for a variable speed transmission having drivingly connected input and output shafts and a member movable for varying the driving ratio between said shafts; a threaded rod engaging said member, a reversible motor connected with said rod, a limit switch in circuit with said motor adapted for being actuated in response to a predetermined amount of movement of said member in the direction to increase the speed of said output shaft, a second threaded rod supporting said limit switch, gearing connecting said rods, first control means for reversibly energizing said motor while simultaneously disengaging said gearing, second control means for reversibly energizing said motor while said gearing remains in engagement.

6. In a control system for a variable speed transmission having drivingly connected input and output shafts and a member movable for varying the driving ratio between said shafts; a threaded rod engaging said member, a reversible motor connected with said rod, a limit switch in circuit with said motor adapted for being actuated in response to a predetermined amount of movement of said member in the direction to increase the speed of said output shaft, a second threaded rod supporting said limit switch, gearing connecting said rods, first control means for reversibly energizing said motor while simultaneously disengaging said gearing, second control means for reversibly energizing said motor while said gearing remains in engagement, said limit switch having normally open contacts in circuit with said second control means adapted for being closed upon actuation of said switch whereby said second control means is effective only when said switch is actuated.

7. In a control system for a variable speed transmission of the type described having a movable member for varying the driving ratio of the transmission, and a threaded rod engaging said member; a limit switch adapted for engagement by said member for predetermining the limit of adjustment of said transmission, a second threaded rod supporting said switch, a gear on each rod, a movable gear adapted for meshing with the gears on said rods to drivingly connect the rods, and electrical means energizable for shifting said movable gear out of engagement with the gears on said rods.

8. In combination in a mechanism of the type described; a pair of threaded rods, the threads on said rods being of the same pitch, one of said rods being adapted for engagement with a movable member and the other of said rods being adapted for engagement with a limit switch to be engaged by said member, a gear on each rod, a tumbler gear normally biased into position to mesh with both of the gears on said rods, and a solenoid energizable for shifting said tumbler gear out of mesh with at least one of the gears on said rods.

9. In a variable speed transmission; a member movable for varying the driving ratio in the transmission, a reversible motor for reversibly actuating said member, limit means for predetermining at least one of the limits of movement of said member, means slidably supporting said limit means, and means selectively operable for clamping said supporting means to said member for movement in unison therewith.

10. In a variable speed transmission; a member movable for varying the driving ratio of the transmission, a reversible motor energizable for actuating said member in its opposite directions of movement, a limit switch engageable by said member for de-energizing said motor at a predetermined point of adjustment of said member to predetermine one of the limits of adjustment of said transmission, means slidably supporting said limit switch for movement in a direction substantially parallel with said member, and means selectively operable for clamping said limit switch stationarily on its support or for unclamping said limit switch from its support and clamping it instead to said member for movement in unison therewith.

11. In a variable speed transmission; a member movable for varying the driving ratio of the transmission, a reversible motor energizable for actuating said member in its opposite directions of movement, a control element mounted for engagement by said member and adapted for de-energizing said motor when so engaged to predetermine at least one limit of adjustment of said member, first control means operable for reversibly energizing said motor while holding said control element stationary, means slidably supporting said control element for movement in a direction parallel to the movement of said member, and second control means normally clamping said control element stationarily to its support but selectively operable for reversibly energizing said motor while simultaneously unclamping said control element to permit sliding movement thereof on its support and clamping the said element to said member for movement in unison therewith, said second control means being operative only while said control element is engaged by said member.

12. In a variable speed transmission having input and output shafts and a member movable for varying the driving ratio between said shafts, a threaded rod engaging said member, a reversible motor connected with said rod, a limit switch in circuit with said motor adapted for being actuated by said member in response to a predetermined amount of movement thereof in a direction to increase the speed of said output shaft for de-energizing said motor, a plate supporting said limit switch, rods slidably supporting said plate, a brake member on said plate movable into braking engagement with one of said rods and normally urged out of braking engagement therewith, an extension part carried by said member and extending to adjacent said plate, electrical means carried by said plate energizable for moving said brake arm into brake engaged position and de-energizable to bring about clamping said extension part to said plate, first control means for reversibly energizing said motor while simultaneously energizing said electrical means, second control means for reversibly energizing said motor while simultaneously de-energizing said electrical means, and said limit switch having contacts in circuit with said second control means, whereby said second control means is effective only when said switch is actuated.

13. In a control system for a variable speed transmission having a constant speed shaft and a variable speed shaft, and reversibly energizable speed changing means for changing the driving ratio between said shafts including a movable member; spaced limit means adapted for engagement by said member operable for stopping operation of speed changing means at predetermined limits of movement of said member when so engaged by the member, movably positioned limit means also adapted for engagement by said member in one direction of movement thereof and also operable when so engaged to halt said speed changing means, means movably supporting said movably positioned limit means for movement in the same direction as said movable member, means selectively operable for drivingly connecting said movably positioned limit means with said member for adjusting the position of said movable positioned limit means by movement of said movably positioned limit means with said member, and means for reversibly energizing said speed changing means.

14. An arrangement as set forth in claim 13 in which means are provided for holding said movably positioned limit means stationary when it is not connected with said movable member.

References Cited in the file of this patent

UNITED STATES PATENTS

| Number | Name | Date |
|---|---|---|
| 815,756 | Sprague | Mar. 20, 1906 |
| 1,326,004 | Stack | Dec. 23, 1919 |
| 1,551,512 | Godd | Aug. 25, 1925 |
| 1,686,851 | Gorman | Oct. 9, 1929 |
| 2,076,202 | Lewellen | Apr. 6, 1937 |
| 2,212,194 | Lewellen | Aug. 20, 1940 |
| 2,494,486 | Peterson | Jan. 10, 1950 |

FOREIGN PATENTS

| Number | Country | Date |
|---|---|---|
| 144,880 | Germany | Oct. 3, 1903 |